United States Patent
Ping et al.

(10) Patent No.: US 8,171,329 B2
(45) Date of Patent: May 1, 2012

(54) METHOD OF DYNAMICALLY ADJUSTING SIGNAL DELAY TIME OF CIRCUIT SYSTEM

(75) Inventors: Te-Lin Ping, Hsinchu (TW); Yao-Cheng Chuang, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 439 days.

(21) Appl. No.: 12/426,926

(22) Filed: Apr. 20, 2009

(65) Prior Publication Data
US 2010/0180141 A1   Jul. 15, 2010

(30) Foreign Application Priority Data

Jan. 14, 2009  (TW) ................................ 98101204 A (51) Int. Cl.
*G06F 1/12* (2006.01)
(52) U.S. Cl. ........................................ 713/401; 365/211
(58) Field of Classification Search .................. 713/401; 365/211
See application file for complete search history.

(56) References Cited

U.S. PATENT DOCUMENTS

| | | | | |
|---|---|---|---|---|
| 6,092,030 A | * | 7/2000 | Lepejian et al. | 702/79 |
| 6,157,231 A | * | 12/2000 | Wasson | 327/156 |
| 7,183,864 B1 | * | 2/2007 | Gutnik | 331/57 |
| 7,209,401 B2 | * | 4/2007 | Norman et al. | 365/212 |
| 7,453,302 B2 | * | 11/2008 | Le et al. | 327/262 |
| 7,548,823 B2 | * | 6/2009 | Singh et al. | 702/79 |
| 7,594,750 B2 | * | 9/2009 | Lee et al. | 374/178 |
| 7,929,366 B2 | * | 4/2011 | Chen | 365/211 |
| 7,937,605 B2 | * | 5/2011 | Rea et al. | 713/503 |
| 2002/0133789 A1 | | 9/2002 | Hsu et al. | |
| 2010/0003932 A1 | * | 1/2010 | Morimoto et al. | 455/102 |

FOREIGN PATENT DOCUMENTS

| | | |
|---|---|---|
| CN | 1913036 A | 2/2007 |
| CN | 101174832 A | 5/2008 |

* cited by examiner

*Primary Examiner* — Glenn A Auve
(74) *Attorney, Agent, or Firm* — Winston Hsu; Scott Margo (57) ABSTRACT

A circuit system periodically checks a system-environment monitor value, and then obtains a system-environment monitor value index corresponding to the system-environment monitor value in the environment-adjustment look-up table. Finally, the circuit system adjusts a signal delay time according to a delay adjustment value corresponding to the system-environment monitor value index.

9 Claims, 7 Drawing Sheets

Table 1/Low temperature

| Delay level of delay adjustment value | 0 | 1 | 2 | 3 | 4 | 5 | 6 | 7 | 8 | 9 |
|---|---|---|---|---|---|---|---|---|---|---|
| Conventional circuit system | | | | ◎ | | | | | | |
| Circuit system of the present invention | | | | ◎ | | | | | | |
| Delay level for normal operation | X | X | O | O | O | O | O | X | X | X |

Table 2/High temperature

| Delay level of delay adjustment value | 0 | 1 | 2 | 3 | 4 | 5 | 6 | 7 | 8 | 9 |
|---|---|---|---|---|---|---|---|---|---|---|
| Conventional circuit system | | | | ◎ | | | | | | |
| Circuit system of the present invention | | | | | | ◎ | | | | |
| Delay level for normal operation | X | X | X | X | O | O | O | O | O | X |

Table 3/Low speed

| Delay level of delay adjustment value | 0 | 1 | 2 | 3 | 4 | 5 | 6 | 7 | 8 | 9 |
|---|---|---|---|---|---|---|---|---|---|---|
| Conventional circuit system | | | | ◎ | | | | | | |
| Circuit system of the present invention | | | | ◎ | | | | | | |
| Delay level for normal operation | X | X | O | O | O | O | O | X | X | X |

Table 4/Medium speed

| Delay level of delay adjustment value | 0 | 1 | 2 | 3 | 4 | 5 | 6 | 7 | 8 | 9 |
|---|---|---|---|---|---|---|---|---|---|---|
| Conventional circuit system | | | | ◎ | | | | | | |
| Circuit system of the present invention | | | | | ◎ | | | | | |
| Delay level for normal operation | X | X | X | X | O | O | O | X | X | X |

Table 5/High speed

| Delay level of delay adjustment value | 0 | 1 | 2 | 3 | 4 | 5 | 6 | 7 | 8 | 9 |
|---|---|---|---|---|---|---|---|---|---|---|
| Conventional circuit system | | | | ◎ | | | | | | |
| Circuit system of the present invention | | | | | ◎ | | | | | |
| Delay level for normal operation | X | X | X | X | X | O | X | X | X | X |

FIG. 7

METHOD OF DYNAMICALLY ADJUSTING SIGNAL DELAY TIME OF CIRCUIT SYSTEM

BACKGROUND OF THE INVENTION

1. Field of the Invention

The present invention is related to a method of adjusting a signal delay time of a circuit system, and more particularly, to a method of dynamically adjusting a signal delay time of a circuit system according to the operational environment of the circuit system.

2. Description of the Prior Art

Generally speaking, an electronic device coordinates different components of the electronic device by using the same clock. For example, in an electronic device with a Dynamic random access memory (DRAM), the output signals of the DRAM are adjusted to be consistent with the system clock of the electronic device. Therefore, the DRAM and the rest components of the electronic device are all controlled by the system clock so as to operate synchronously with each other. However, electronic devices generally have a clock skew problem. The clock skew problem means the clock reaches different components of an electronic device at different times, which is often caused by the delay of the clock buffer circuit and the driving circuit, or the delay of the other resistor-inductor circuit. Thus, the above-mentioned DRAM can not be synchronized with the system clock because of the clock skew problem, causing an abnormal operation of the DRAM.

Figure 1:
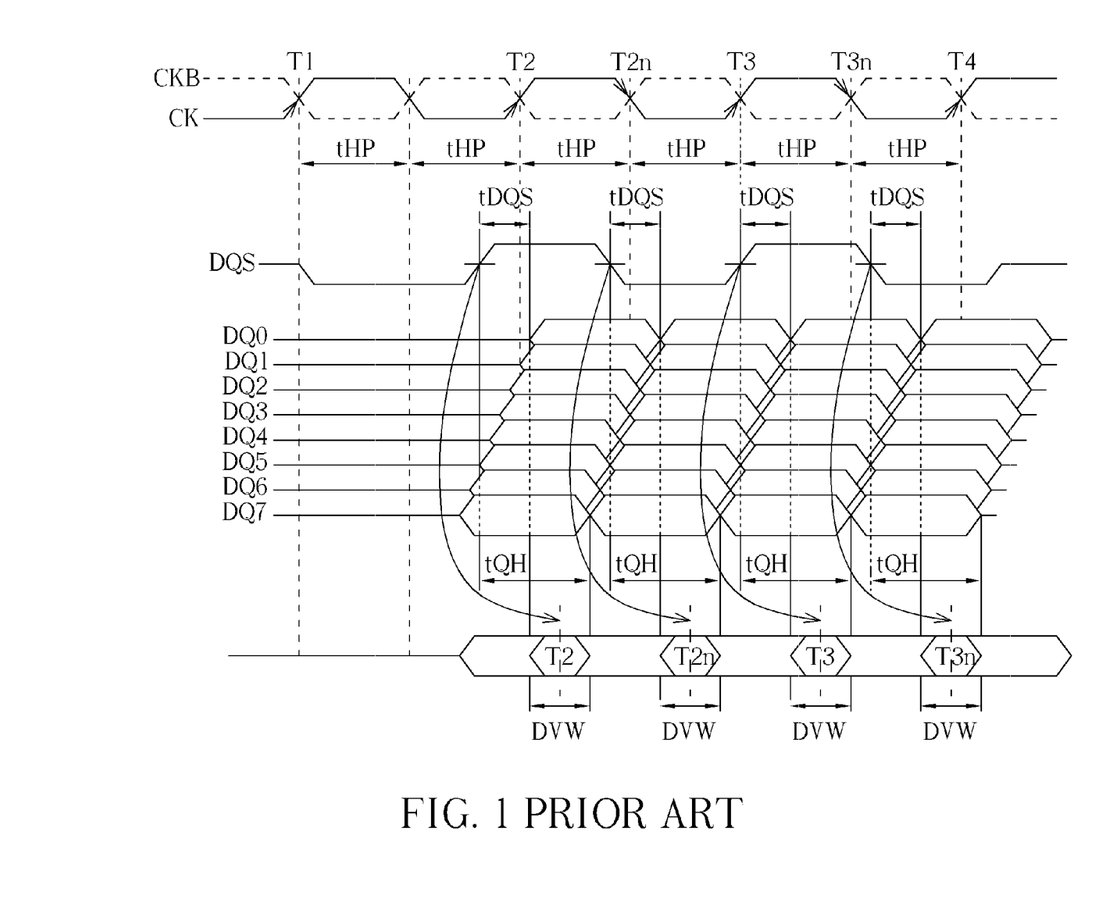
FIG. 1 is a waveform diagram of output data of a conventional DDR SDRAM.

Please refer to FIG. 1. FIG. 1 is a waveform diagram of output data of a conventional Double Data Rate (DDR) Synchronous Dynamic Random Access Memory (SDRAM). The timing of outputting data signals is enabled to be on active duty by the rising or falling edge of the clock signals CK or CKB. The phase of the clock signal CK is opposite to the clock signal CKB. DQ0~DQ7 are the data signals transmitted by the data buses. Since the transmitting paths of the data signals are different, the phases of the data signals are different. That is, the start of the available interval of the data signal DQ7 is the earliest one, and that of the data signal DQ0 is the latest one. By contrast, the end of the available interval of the data signal DQ7 is also the earliest one, and that of the data signal DQ0 is the latest one. In FIG. 1, a data strobe signal DQS is designed as a sampling reference signal of the data signal, tHP is the half cycle of the clock signal CK, tDQS is the interval between the positive edge or the negative edge of the data strobe signal DQS to the start of the available interval of the data signal DQ0, tQH is the interval between the positive edge or the negative edge of the data strobe signal DQS to the end of the available interval of the data signal DQ7, and the overlap between the available intervals of the data signals DQ0~DQ7 is a data valid window DVW.

Figure 2:
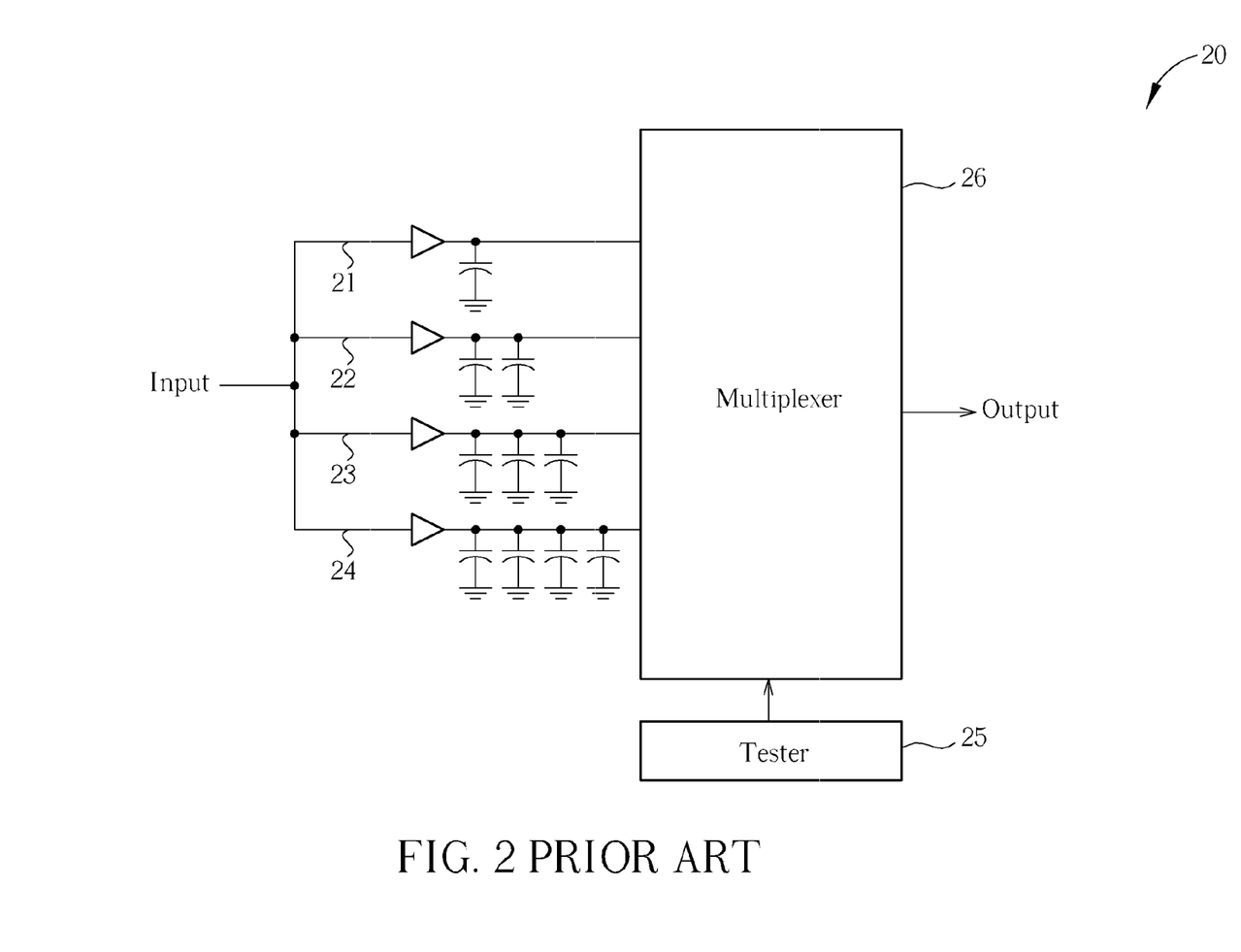
FIG. 2 is a diagram illustrating a conventional delay circuit.

Please refer to FIG. 2. FIG. 2 is a diagram illustrating a conventional delay circuit 20. The delay circuit 20 is utilized for generating a signal delay time according to a delay value of the delay chain. Furthermore, for the sake of accuracy and stability on data access, the positive edge or the negative edge of the data strobe signal DQS is preferably postponed to the center of the data valid window, and therefore a delay circuit 20 capable of adjusting the signal delay time is put forth to satisfy the aforesaid preferable requirement. As shown in FIG. 2, the delay circuit 20 selects one of the delay chains 2124 as the best delay path through a multiplexer 26 enabled to be on active duty by a tester 25 during the testing stage of an electronic device. After the delay interval between the input terminal and output terminal is tuned to a default value, the signal delay time is constant, not variable. However, several disadvantages exist in the conventional method of adjusting the signal delay time and are to be overcome. For example, the best delay path of an electronic device has to be determined before the electronic device with the delay chain circuit is used. Therefore, the signal delay time can not be dynamically adjusted according to the actual operational environment of the electronic device. For example, the signal delay time can not be dynamically adjusted when the electronic device operates at a rising temperature or at a higher speed. In addition, each component of the electronic device has to predetermine their delay paths during the test phase, increasing the cost and the time of manufacturing and testing.

For example, the data valid window of a PC 133 DDR SDRAM module requires a minimum interval not less than 2.625 nanoseconds (ns). Considering the skew time caused by the various characteristics of the printed circuit board (around 0.513 ns) during the minimum data valid window, the setup and hold time of the controller (around 0.6 ns), and the strobe placement uncertainty of the data strobe signal DQS (around 0.4 ns), the residual margin time is only 0.1 ns. Because the strobe placement uncertainty of the data strobe DQS can be doubled when surrounding temperature varies from case to case, errors occur frequently in data access.

In conclusion, a method of dynamically adjusting the signal delay time of the circuit system according to the operational environment is required for accuracy and stability on data access.

SUMMARY OF THE INVENTION

An objective of the present invention is to provide a method of dynamically adjusting a signal delay time of a circuit system.

The present invention provides a method of dynamically adjusting a signal delay time of a circuit system. The method comprises establishing an environment-adjustment look-up table, periodically checking a system-environment monitor value, obtaining a system-environment monitor value index corresponding to the system-environment monitor value according to the environment-adjustment look-up table, and adjusting the signal delay time according to a delay adjustment value corresponding to the system-environment monitor value index.

The present invention further provides a circuit system capable of dynamically adjusting a signal delay time. The circuit system comprises a delay circuit, and a controller. The delay circuit is utilized for generating the signal delay time according to a delay value of a delay chain. The controller is utilized for adjusting the delay value of the delay chain. The controller comprises a ring oscillator, and an environment-adjustment look-up table. The ring oscillator is utilized for generating a system-environment monitor value. The environment-adjustment look-up table is utilized for providing the relation between the system-environment monitor value and the delay value of the delay chain.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
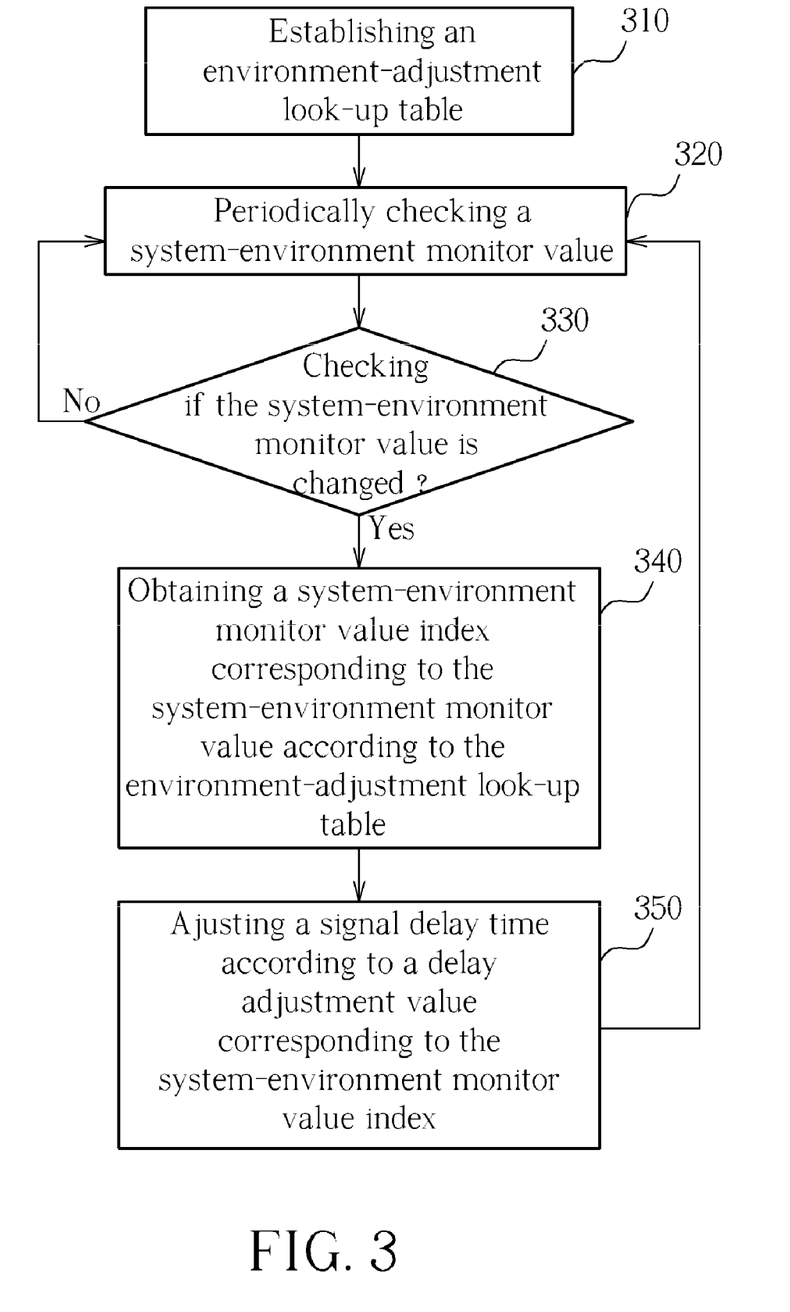
FIG. 3 is a flow diagram illustrating a method of dynamically adjusting a signal delay time of a circuit system according to the present invention.

Please refer to FIG. 3. FIG. 3 is a flow diagram illustrating a method of dynamically adjusting a signal delay time of a circuit system according to the present invention. The method of the present invention can periodically check the variance of the system-environment monitor value according to the operational environment of the circuit system (for example, operational speed and operational temperature). When the range of the delay adjustment value for normal operation shifts or reduces, the circuit system can obtain a new best delay adjustment value according to the system-environment monitor value for operating with the most stable delay adjustment value. The method of adjusting a signal delay time of a circuit system according to the present invention is described as the following steps:

Step 310: establish an environment-adjustment look-up table according to the relation between the system-environment monitor value, and the delay adjustment value in various operational environments.

Step 320: periodically check a system-environment monitor value.

Step 330: determine whether the system-environment monitor value is changed; if changed, execute the step 340; else, go back to the step 320.

Step 340: obtain a system-environment monitor value index corresponding to the present system-environment monitor value according to the environment-adjustment look-up table, if the difference between the system-environment monitor value index corresponding to the system-environment monitor value, and a system-environment monitor value index correspond to the delay adjustment value presently used by the circuit system (present system-environment monitor value index) is not more than one delay level, the signal delay time presently used by the circuit system is not required to be adjusted; else, obtain a correct system-environment monitor value index according to the environment-adjustment look-up table.

Step 340: adjust the signal delay time according to a delay adjustment value corresponding to the correct system-environment monitor value index, but when the correct system-environment monitor value index is different from the present system-environment monitor value index by two delay levels more, adjust signal delay time according to a delay adjustment value corresponding to a system-environment monitor value index different from the present system-environment monitor value index by one delay level. In the present invention, the objective of using the delay adjustment value by one delay level at one time to adjust the signal delay time is to avoid the problem caused by the large variance of the phase of the signal between two continuous cycles. After the present adjustment, go back to the step 320. The circuit system can operate with the best delay adjustment value after plural minor adjustments.

Figure 4:
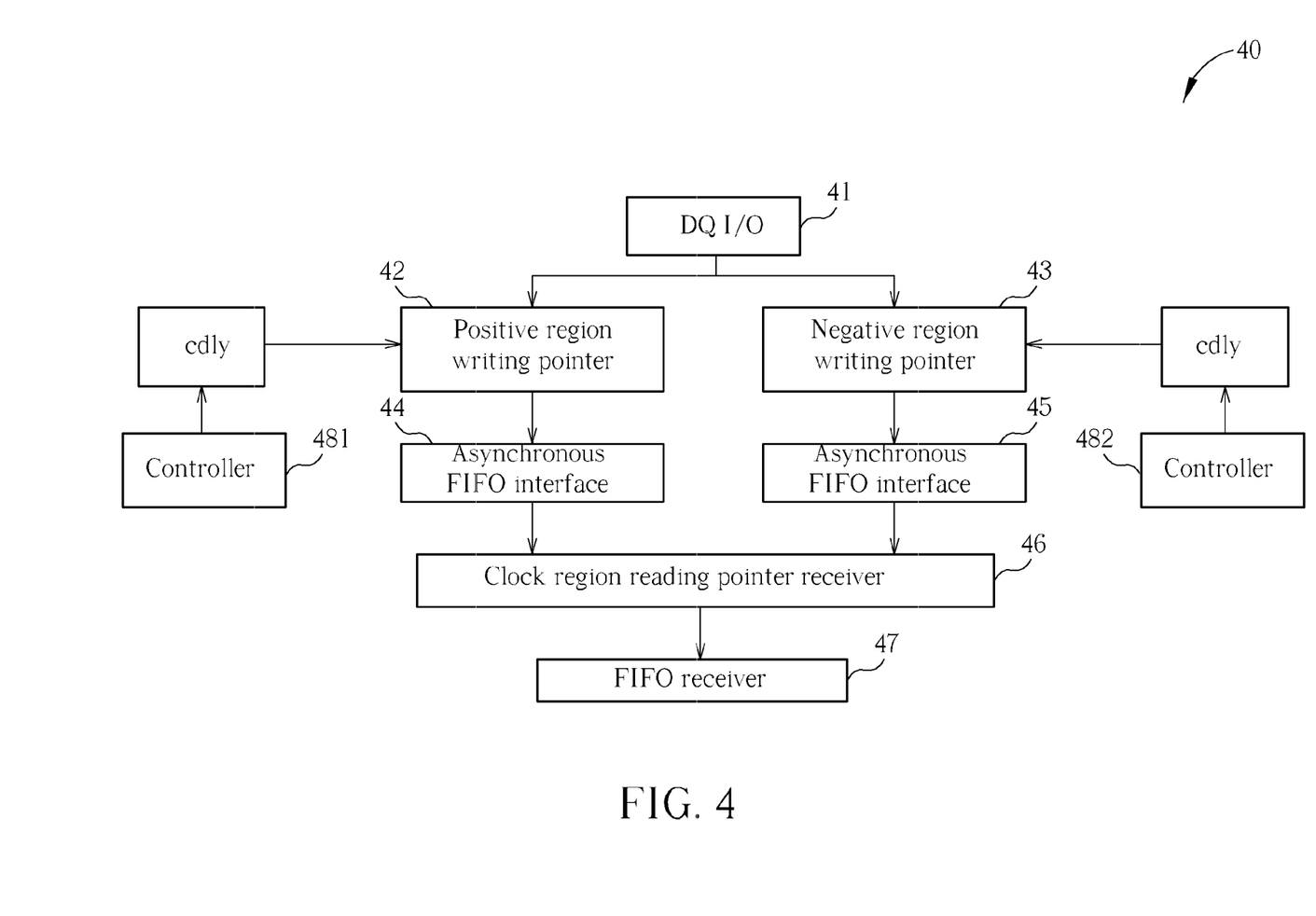
FIG. 4 is a diagram illustrating a method applied in a Double-Data-Rate Two Synchronous Dynamic Random Access Memory according to the present invention.

Please refer to FIG. 4. FIG. 4 is a diagram illustrating a method applied in a Double-Data-Rate Two Synchronous Dynamic Random Access Memory (DDR2-SDRAM) according to the present invention. The DDR2-SDRAM 40 comprises a data input/output (DQ I/O) interface 41, a positive region writing pointer 42, a negative region writing pointer 43, two asynchronous First-In-First-Out (FIFO) interfaces 44 and 45, a clock region reading pointer receiver 46, a FIFO receiver 47 and two controllers 481 and 482. The controllers 481 and 482 comprise a timer, a ring oscillator, and an environment-adjustment look-up table respectively. The DDR2-SDRAM 40 is a circuit system with input and output. The signal delay time is required to be adjusted when reading/writing data. In the present embodiment, the delay adjustment value is the delay values of the delay chains of the DDR2-SDRAM 40. The system-environment monitor value is the value of the ring oscillator. The timer interrupt is utilized for periodically checking the system-environment monitor value. The delay values of the delay chains cdly and cldy_n have to be adjusted for the clock correctly sampling the data when reading/writing data from/to the DDR2-SDRAM 40. According to the method of the present invention, first, establish an environment-adjustment look-up table according to the relation between the value of the ring oscillator and the delay values of the delay chains of the DDR2-SDRAM 40 in various operational environments. Then, use the timer interrupt for periodically checking if the value of the ring oscillator is changed. According to the environment-adjustment look-up table, if the difference between the looked-up and the present ring oscillator value index is not more than one delay level, the delay values of the delay chains of the DDR2-SDRAM are not required to be adjusted; else, obtain a correct ring oscillator value index according to the environment-adjustment look-up table so as to adjust the delay values of the delay chains of the DDR2-SDRAM 40 to be the values correspond to the correct ring oscillator value index. When adjusting the delay values of the delay chains of the DDR2-SDRAM 40, a minor adjustment method is adopted. That is, the delay values of the delay chains are adjusted only by one delay level at one time for avoiding the large variance of the phases of the signals between two continuous cycles. When a large adjustment of the delay value of the delay chains is required, the large adjustment can be achieved by repeated minor adjustments.

Figure 5:
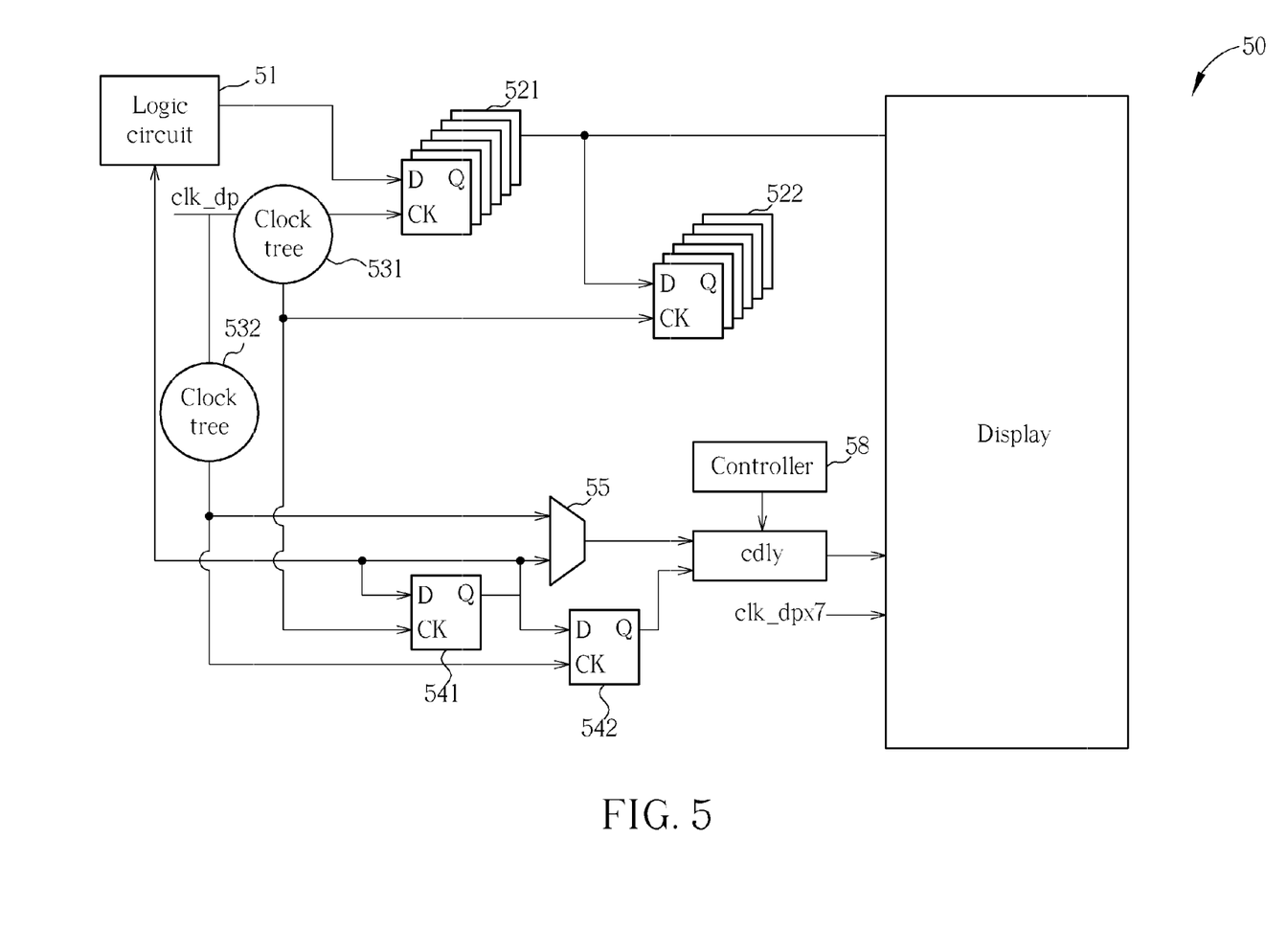
FIG. 5 is a method applied in a Low-Voltage Differential Signaling interface according to the present invention.

Please refer to FIG. 5. FIG. 5 is a method applied in a Low-Voltage Differential Signaling (LVDS) interface according to the present invention. The LVDS interface is an application of the output system. Thus, the signal delay time of the output is required to be adjusted. The LVDS interface 50 comprises a logic circuit 51, a first set of register 521, a second set of register 522, a first clock tree 531, a second clock tree 532, a first latch 541, a second latch 542, a multiplexer 55, and a controller 58. The controller 58 comprises a timer, a ring oscillator, and an environment-adjustment look-up table. In the present embodiment, the delay adjustment value is the delay value of the delay chain of the LVDS signal. The system-environment monitor value is the value of the ring oscillator. The timer interrupt is used for periodically checking if the system-environment monitor value is changed. The LVDS interface uses the clocks clk_dp and clk_dpx7 with the different frequencies, and uses the delay value of the delay chain of the LVDS signal cdly for adjusting the signal delay time. According to the method of the present invention, first, establish an environment-adjustment look-up table according to the relation between the value of the ring oscillator and the delay value of the delay chain of the LVDS signal in various operational environments. Then, use the timer interrupt for periodically checking if the value of the ring oscillator is changed. According to the environment-adjustment look-up table, if the difference between the looked-up and the present ring oscillator value index is not more than one delay level, the delay value of the delay chain of the LVDS signal is not required to be adjusted; else, obtain a correct ring oscillator value index according to the environment-adjustment look-up table so as to adjust the delay value of the delay chain of the LVDS signal to be the value correspond to the correct ring oscillator value index. When adjusting the delay value of the delay chain of the LVDS signal, a minor adjustment method is adopted. That is, the delay value of the delay chain of the LVDS signal is adjusted only by one delay level at one time for avoiding the large variance of the phase of the LVDS signal between two continuous cycles. When a large adjustment of the delay value of the delay chain is required, the large adjustment can be achieved by repeated minor adjustments.

Figure 6:
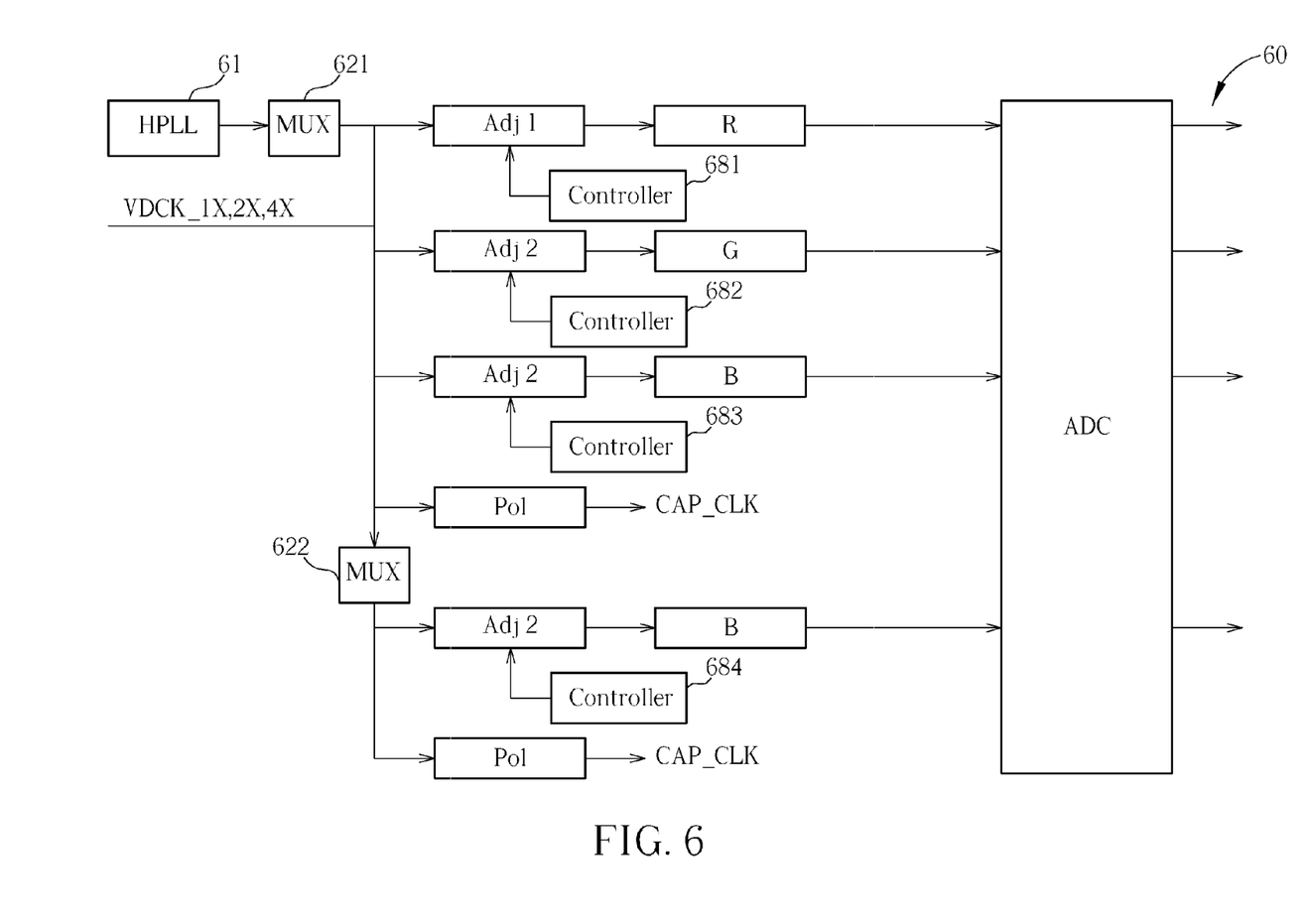
FIG. 6 is a method applied in a Television Analog-to-Digital Converter according to the present invention.

Please refer to FIG. 6. FIG. 6 is a method applied in a Television Analog-to-Digital Converter (TVADC) according to the present invention. The TVADC 60 comprises a Horizontal Phase-Locked Latch (HPLL) 61, two multiplexers 621 and 622, plural transmission channels 63, and four controllers 681~684. The controllers 681~684 respectively comprises a timer, a ring oscillator, and an environment-adjustment look-up table. The TVDAC is an input system. Therefore, the signal delay time of the inputs are required to be adjusted. In the present invention, the delay adjustment value is the delay value of the delay chain of the TVDAC. The system-environment monitor value is the value of the ring oscillator. The timer interrupt is utilized for periodically checking so as to obtain the system-environment monitor value. The TVDAC uses plural interfaces with different frequencies. Hence, a plurality of delay values of the delay chains of the TVDAC signals is required for adjusting the signal delay time. According to the method of the present invention, first, establish an environment-adjustment look-up table according to the relation between the value of the ring oscillator and the plurality of the delay values of the delay chains of the TVDAC signals in various operational environments. Then, periodically check if the value of the ring oscillator is changed by means of the timer interrupt. According to the environment-adjustment look-up table, if the difference between the looked-up and the present ring oscillator value index is not more than one delay level, the plurality of the delay values of the delay chains of the TVDAC signals is not required to be adjusted; else, obtain a correct ring oscillator value index according to the environment-adjustment look-up table so as to adjust the plurality of the delay values of the delay chain of the TVDAC signals to be the values correspond to the correct ring oscillator value index. When adjusting the plurality of the delay values of the delay chains of the TVDAC signals, a minor adjustment method is adopted. That is, the delay values of the delay chains of the TVDAC signals is adjusted only by one level at one time for avoiding the large variance of the phases of the TVDAC signals between two continuous cycles. When a large adjustment of the delay values of the delay chains is required, the large adjustment can be achieved by repeated minor adjustments.

Figure 7:
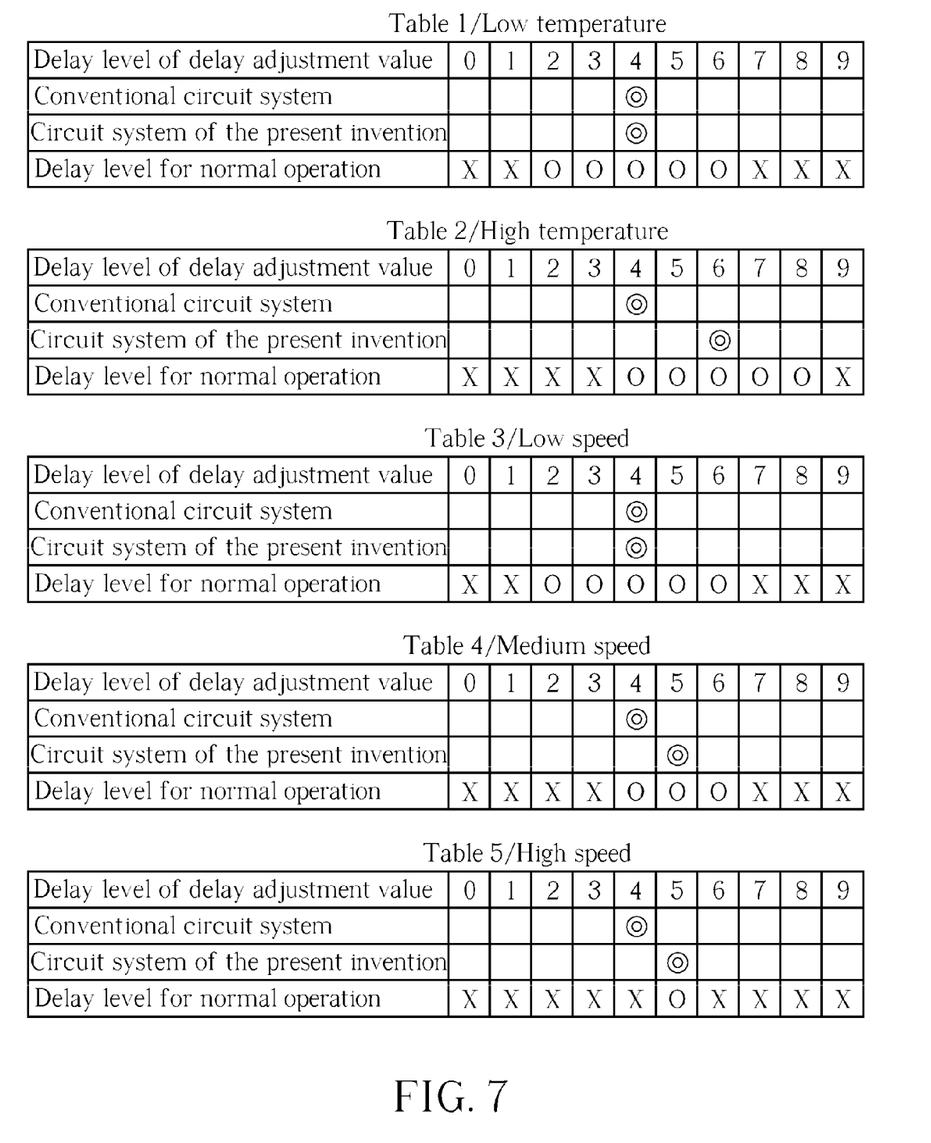
FIG. 7 is diagram illustrating the comparing tables of a conventional circuit system and a circuit system of the present invention operating in various operational environments.

Please refer to FIG. 7. FIG. 7 is diagram illustrating the comparing tables of a conventional circuit system and a circuit system of the present invention operating in various operational environments. The table 1 is a comparing table when the circuit systems operate at a low temperature. The table 2 is a comparing table when the circuit systems operate at a high temperature. The table 3 is a comparing table when the circuit systems operate at a low speed. The table 4 is a comparing table when the circuit systems operate at a medium speed. The table 5 is a comparing table when the circuit systems operate at a high speed. Comparing the table 1 with the table 2, when the circuit systems operate at a low temperature, the delay levels of the delay adjustment values for normal operation are from 2 to 6. The delay level of the delay adjustment value adopted by the circuit system of the present invent is 4 at the time. The delay level of the delay adjustment value adopted by the conventional circuit system is 4 at the time as well. However, when the circuit systems operate at a high temperature, the delay levels of the delay adjustment values for normal operation become from 4 to 8. The delay level of the delay adjustment value adopted by the circuit system of the present invent is 6 at the time, but delay level of the delay adjustment value adopted by the conventional circuit system remains 4 at the time. According to the table 3, the table 4, and the table 5, when the operational speed becomes higher, the range of the delay levels of the delay adjustment value is reduced. Consequently, the delay level of the delay adjustment value adopted by the conventional circuit system is not in the range of the delay level of the delay adjustment value for normal operation, but the delay level of the delay adjustment value adopted by the circuit system of the present invention can be dynamically adjusted for normal operation.

In conclusion, the present invention provides a method of dynamically adjusting a signal delay time of a circuit system for the circuit system operating with the best delay adjustment value. The circuit system of the present invention periodically checks a system-environment monitor value, and then obtains a system-environment monitor value index corresponding to the system-environment monitor value. Finally, the circuit system of the present invention adopted a delay adjustment value corresponding to the system-environment monitor value index for adjusting the signal delay time.

Those skilled in the art will readily observe that numerous modifications and alterations of the device and method may be made while retaining the teachings of the invention.

What is claimed is:

1. A method of dynamically adjusting a signal delay time of a circuit system, comprising:
    establishing an environment-adjustment look-up table;
    periodically checking a system-environment monitor value;
    obtaining a system-environment monitor value index corresponding to the system-environment monitor value according to the environment-adjustment look-up table;
    comparing the system-environment monitor value index corresponding to the system-environment monitor value with a system-environment monitor value index corresponding to a delay adjustment value presently used by the circuit system to generate a comparison result; and
    adjusting the signal delay time according to a delay adjustment value corresponding to the system-environment monitor value index and the comparison result.

2. The method of claim 1, wherein establishing the environment-adjustment look-up table comprises:
    establishing the environment-adjustment look-up table of the circuit system operating at a low temperature, at a high temperature, at a low speed, at a medium speed, and at a high speed.

3. The method of claim 1, wherein periodically checking the system-environment monitor value comprises:

generating the system-environment monitor value by means of a ring oscillator; and periodically checking the system-environment monitor value by means of a timer.

4. The method of claim 1, wherein adjusting the signal delay time according to the delay adjustment value corresponding to the system-environment monitor value index and the comparison result comprises:

when the comparison result indicates the difference between the system-environment monitor value index corresponding to the system-environment monitor value, and the system-environment monitor value index corresponding to the delay adjustment value presently used by the circuit system is more than two delay levels, a delay adjustment value corresponding to a system-environment monitor value index different from the system-environment monitor value index corresponding to the delay adjustment value presently used by the circuit system by one delay level is adopted for adjusting the signal delay time.

5. A circuit system capable of dynamically adjusting a signal delay time, comprising:

a delay circuit, for generating the signal delay time according to a delay value of a delay chain; and a controller comprising:

a ring oscillator, for generating a system-environment monitor value; and an environment-adjustment look-up table, for providing a relation between the system-environment monitor value and the delay value of the delay chain wherein the controller obtains a system-environment monitor value index corresponding to the system-environment monitor value according to the environment-adjustment look-up table, compares the system-environment monitor value index corresponding to the system-environment monitor value with a system-environment monitor value index corresponding to a delay adjustment value presently used by the circuit system to generate a comparison result, and adjusting the signal delay time according to the delay adjustment value corresponding to the system-environment monitor value index and the comparison result.

6. The circuit system of claim 5, wherein the controller further comprises:

a timer, for periodically checking the system-environment monitor value.

7. The circuit system of claim 5, wherein the circuit system is a Double-Data-Rate Two Synchronous Dynamic Random Access Memory (DDR2-SDRAM).

8. The circuit system of claim 5, wherein the circuit system is a Low-Voltage Differential Signaling (LVDS) interface.

9. The circuit system of claim 5, wherein the circuit system is a Television Analog-to-Digital Converter (TVADC).

* * * * *